United States Patent
Siltanen

(10) Patent No.: US 10,344,925 B2
(45) Date of Patent: Jul. 9, 2019

(54) ELONGATED LIGHTING DEVICE HAVING A CURVED SHAPE AND METHOD FOR MANUFACTURING

(71) Applicant: Teknoware Oy, Lahti (FI)

(72) Inventor: Oskari Siltanen, Lahti (FI)

(73) Assignee: Teknoware Oy, Lahti (FI)

( * ) Notice: Subject to any disclaimer, the term of this patent is extended or adjusted under 35 U.S.C. 154(b) by 0 days.

(21) Appl. No.: 16/011,125

(22) Filed: Jun. 18, 2018

(65) Prior Publication Data

US 2018/0372282 A1 Dec. 27, 2018

(30) Foreign Application Priority Data

Jun. 22, 2017 (FI) ..................... 20175592

(51) Int. Cl.

| | |
|---|---|
| *F21S 4/26* | (2016.01) |
| *F21S 8/00* | (2006.01) |
| *F21V 8/00* | (2006.01) |
| *G09F 13/22* | (2006.01) |
| *F21V 3/02* | (2006.01) |
| *F21V 19/00* | (2006.01) |

(Continued)

(52) U.S. Cl.
CPC . *F21S 4/26* (2016.01); *F21S 4/28* (2016.01); *F21S 8/03* (2013.01); *F21V 3/02* (2013.01); *F21V 19/0045* (2013.01); *G02B 6/0073* (2013.01); *G09F 13/22* (2013.01); *F21V 15/013* (2013.01); *F21W 2121/00* (2013.01); *F21Y 2103/10* (2016.08); *F21Y 2103/30* (2016.08); *F21Y 2115/10* (2016.08)

(58) Field of Classification Search
CPC .. F21S 4/26; F21S 8/03; G02B 6/0073; G09F 13/22; F21Y 2115/10; F21Y 2103/10
See application file for complete search history.

(56) References Cited

U.S. PATENT DOCUMENTS

| 5,343,375 A | 8/1994 | Gross et al. |
|---|---|---|
| 5,810,463 A | 9/1998 | Kawahara et al. |
| (Continued) | | |

FOREIGN PATENT DOCUMENTS

| CN | 2700707 Y | 5/2005 |
|---|---|---|
| CN | 206 159 896 U | 5/2017 |
| WO | WO 2006/039849 A1 | 4/2006 |

OTHER PUBLICATIONS

Extended European Search Report for corresponding European Patent Application No. 18178510.6 dated Sep. 6, 2018, 10 pages.
(Continued)

*Primary Examiner* — Tracie Y Green
(74) *Attorney, Agent, or Firm* — Merchant & Gould P.C.

(57) ABSTRACT

A lighting device and a method for manufacturing a lighting device, the lighting device comprising an elongated body (10), a cover (20), and one or more light sources (30). The body (10) of the lighting device comprises a bottom (13) and walls (11, 12) extending from the bottom and having open edges, whereby the cover (20) of the lighting device is formed from a light transmitting plastic material tube arranged between the open edges of said walls (11, 12) at a distance from the bottom (13), the one or more light sources (30) being located in a space delimited by the body (10) and the cover (20) of the lighting device, the body of the lighting device comprising at least one curved portion to provide a curved lighting device.

14 Claims, 3 Drawing Sheets

(51) Int. Cl.
*F21S 4/28* (2016.01)
*F21V 15/01* (2006.01)
*F21W 121/00* (2006.01)
*F21Y 115/10* (2016.01)
*F21Y 103/30* (2016.01)
*F21Y 103/10* (2016.01)

(56) References Cited

U.S. PATENT DOCUMENTS

| | | | |
|---|---|---|---|
| 6,056,420 A | 5/2000 | Wilson et al. | |
| 6,361,186 B1 | 3/2002 | Slayden | |
| 2005/0036310 A1 | 2/2005 | Fan | |
| 2007/0064409 A1 | 3/2007 | Hulse | |
| 2007/0153517 A1 | 7/2007 | Sloan et al. | |
| 2011/0069486 A1 | 3/2011 | Martin et al. | |
| 2011/0260614 A1* | 10/2011 | Hartikka | H05B 33/0803 315/51 |
| 2011/0260622 A1* | 10/2011 | Hartikka | F21V 25/04 315/113 |
| 2012/0299494 A1* | 11/2012 | Hartikka | H05B 33/0842 315/201 |
| 2013/0021777 A1 | 1/2013 | Pickard et al. | |

OTHER PUBLICATIONS

Finnish Search Report for Finnish Patent Application No. 20175592 dated Jan. 25, 2018, 3 pages.

Montes de Oca, S., "Create Custom LED Light Fixtures with Flexible Aluminum LED Profiles", Nov. 30, 2016, 5 pages, online: https://www.superbrightleds.com/blog/create-custom-led-light-fixtures-flexible-aluminum-led-profiles/3335/.

"Tsubaki Flexible Smooth", Atex Interior Accent Lighting Series, 2005, 5 pages, online: http://www.atexlightingsolutions.com/downloads/pdf/datasheets/interior/tsubaki/TSF-I.pdf.

* cited by examiner

ELONGATED LIGHTING DEVICE HAVING A CURVED SHAPE AND METHOD FOR MANUFACTURING

This application claims benefit of Ser. No. 20175592, filed 22 Jun. 2017 in Finland and which application is incorporated herein by reference. To the extent appropriate, a claim of priority is made to the above disclosed application.

FIELD OF THE INVENTION

The invention relates to lighting devices, and specifically to elongated lighting device structures having a curved shape.

BACKGROUND OF THE INVENTION

An elongated lighting device that may be bent to adapt to the shape of a structure, for example, is needed for many purposes. For example, such lighting devices may be used as a detail of interior decoration, or as an extension of an otherwise straight line of lights. Elongated lighting devices are usually decorative lights, fixedly installed to a wall, a vertical element or a ceiling of a structure.

Lighting devices typically include three basic components: a body, a light source and a light diffusing cover element. One or more light sources are disposed between the body and the cover element, whereby the lighting device is a closed lighting device. In fixedly installed lighting devices, the body is fastened to a structure, such as a wall, a ceiling, or the like. The light sources between the body and the cover may be, for example, of the type of LED light sources, for which the necessary power supply is provided.

In elongated lighting devices it is particularly advantageous to use several LED light sources due to their small size, such that several of them may be disposed in the lighting device at regular spacing to provide uniform lighting. The use of LED light sources also makes it possible to provide curved lighting devices, because due to the small size of the light sources, the curved shape does not hamper their installation.

The problem in providing curved lighting devices specifically relates to the challenges of manufacturing the cover. The curved cover may be formed by injection moulding, but the moulds used for injection moulding constitute a significant cost factor, especially if a single lighting device or just a few lighting devices are made to order. Even if the curved cover could be cost-effectively manufactured by injection moulding, the body of the lighting device must be precisely adapted to the dimensions of the cover to enable reliable fastening of the body and the cover. Thus, there is need for a structurally simpler lighting device than those of the prior art, that may further be produced more cost-effectively than before.

BRIEF DESCRIPTION OF THE INVENTION

The object of the invention is to provide a lighting device and a method for providing a lighting device so as to be able to solve the above mentioned problems. The object of the invention is achieved with a lighting device and a method characterized by the features of the independent claims. The preferred embodiments of the invention are presented in the dependent claims.

The invention is based on the concept of a lighting device having an elongated body with at least one curved portion. The body may be provided, for example, from an aluminium profile or injection moulded plastic. The aluminium profile may be bent to a suitable shape, whereas injection moulded plastic may be manufactured directly to a suitable shape. The aluminium profile is bent such that a distance between edge areas in the body is maintained substantially the same. The cover element of the lighting device is formed from a tube disposed between the edge areas of the body. The tube used as the cover element is preferably formed from PC plastic, and it may be bent to the shape of the body. The light sources of the lighting device are disposed between the cover element and the body, such that a substantially closed lighting device is provided.

The advantage of the lighting device according to the invention is that it is structurally simple and reliable. A suitable curve may be provided for the lighting device by bending the aluminium profile or injection moulding the body to a suitable shape. The tube used as the cover element does not need any fastening elements, but has a round profile. The cover element is thus particularly advantageous in terms of costs and easy to install to the body. No moulds or specific tools are required for manufacturing the cover element. The manufacture of the aluminium profile used as the body element and its bending to a suitable shape are also simple operations, and the same applies to the manufacture of the body by injection moulding.

The body of the lighting device has a bottom and walls projecting from the bottom. The walls project preferably parallel from the bottom, with notches or the like formed at the open ends of the walls for positioning the tube therebetween. The bottom of the body, the walls, and the cover, after being installed, enclose a space in which the light sources of the lighting device may be disposed as appropriate. According to one embodiment, the light sources are disposed at a distance from the bottom of the body, and fasteners are formed at the edges for a circuit board or another support on which the light sources may be positioned.

BRIEF DESCRIPTION OF THE FIGURES

The invention will now be described in detail in connection with preferred embodiments, with reference to the accompanying drawings, in which.

DETAILED DESCRIPTION OF THE INVENTION

Figure 1:
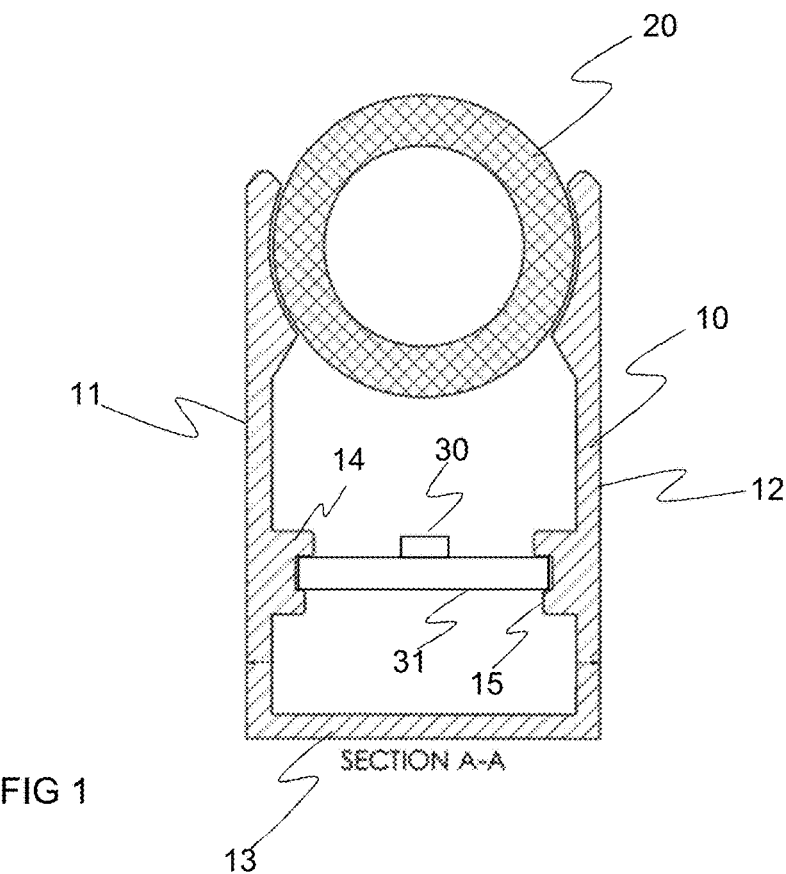
FIG. 1 is a cross-sectional view of a lighting device of an embodiment of the invention.

FIG. 1 is a cross-sectional view of a lighting device according to one embodiment of the invention. The lighting device of the invention is elongated, and the body of the lighting device is manufactured, for example, from an aluminium profile, i.e. extruded aluminium, or injection moulded plastic. FIG. 1 shows an example of the body of the lighting device in a basic form of a U-shape.

The lighting device of FIG. 1 comprises a body 10, a cover 20, and at least one light source 30. The body of the lighting device further comprises a bottom 13 forming a plane, and walls 11, 12 extending from the bottom with open edges. The body of the elongated lighting device, the bottom of the body, and the walls are also elongated, i.e. the U-shaped profile of the lighting device extends along the full extent of the lighting device. The walls 11, 12 shown in the profile of FIG. 1 thus extend in the longitudinal direction of the lighting device, and the walls have inner and outer surfaces. The walls are integrated to the bottom, and the open edges of the walls refer to the edges of the walls located at a distance from the bottom of the body.

In the lighting device according to the invention, the cover 20 of the lighting device is formed from a light transmitting plastic material tube. The tube is arranged between the open edges of the walls 11, 12 at a distance from the bottom 13. The cover 20, the walls 11, 12 and the bottom 13 delimit an elongated space, and according to the invention, the one or more light sources 30 are disposed in the space delimited by the body and the cover of the lighting device.

Figure 2:
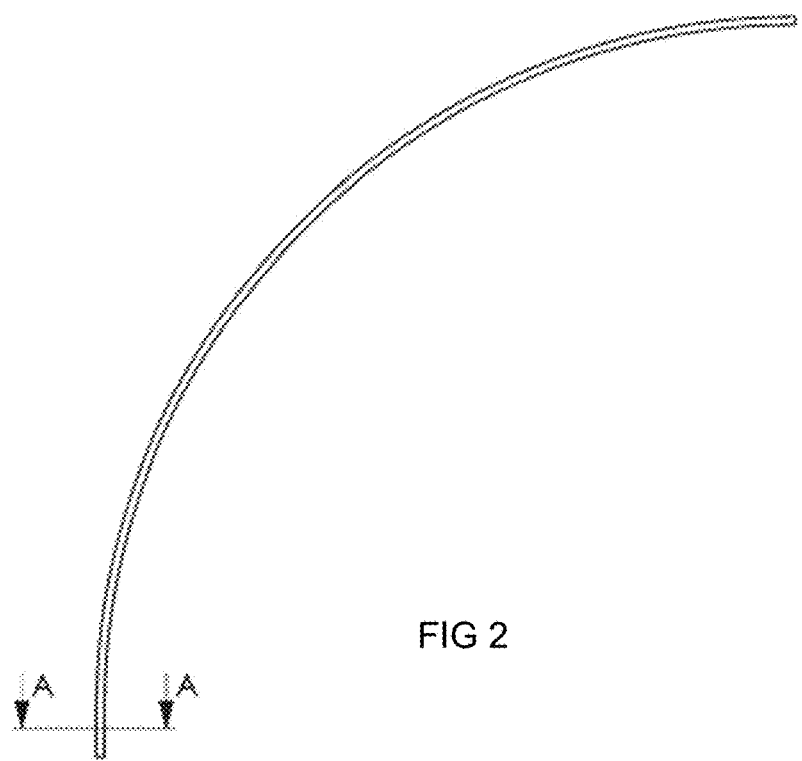
FIG. 2 shows a curved lighting device according to the invention.

Further, the body of the lighting device comprises at least one curved portion. Preferably, the body is formed from an aluminium profile, and the curved portion is formed by bending the body for example in the plane formed by the bottom of the body. FIG. 2 shows an example of a curved lighting device according to the invention as seen from the direction of the cover of the lighting device. FIG. 2 also shows the point of the section of FIG. 1, A-A. According to another embodiment, the body of the lighting device is an injection moulded plastic body comprising at least one curved portion. The injection moulded plastic body is brought to the curved shape in connection with manufacture.

The curved portion formed in the lighting device is made for example by bending the body in a lateral direction. The lateral direction is herein defined as a direction perpendicular to a plane of the outer faces of the walls. When the body of the lighting device is bent in the lateral direction as defined, the bottom of the body is maintained in the same plane as before bending. Before bending the elongated aluminium profile, the profile is substantially straight, whereby the bottom of the body defines a plane. Bending in the lateral direction changes the shape of the structure, but the bottom is maintained in the same plane. In the curved shape, one of the walls of the body is formed concave, while the other wall is correspondingly formed convex. For example, in connection with FIGS. 1 and 2, the outer surface of wall 11 of the body is concave due to bending, while correspondingly the outer surface of wall 12 is convex.

Figure 6:
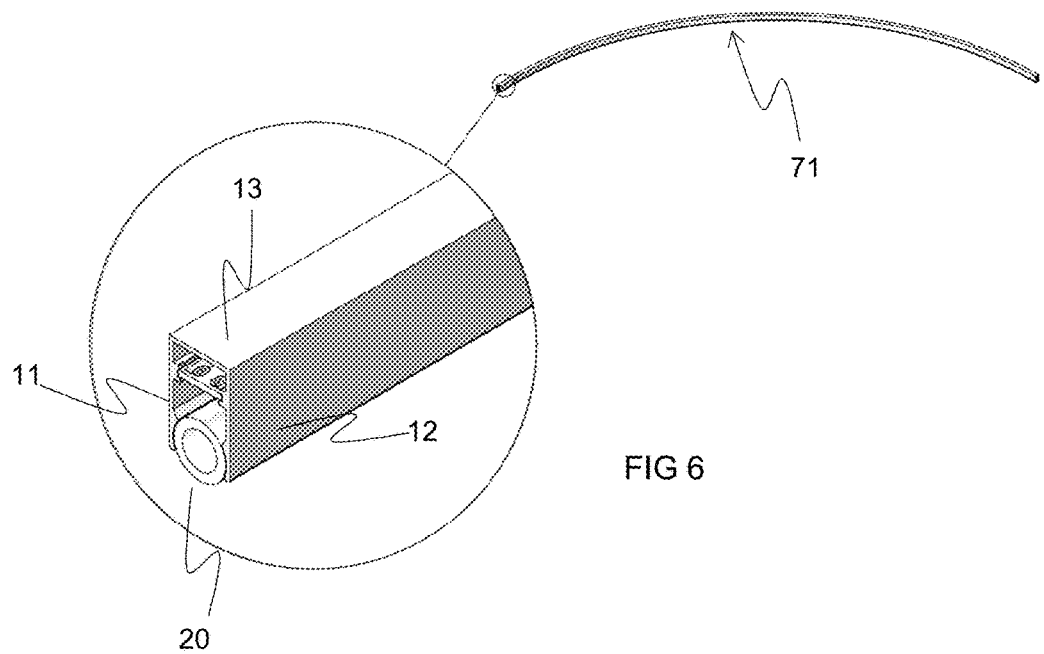
FIG. 6 is a perspective view of a lighting device according to one embodiment of the invention.

FIG. 6 is a perspective view of a curved lighting device, the bottom of which is bent in a plane. FIG. 6 also shows a detail of the lighting device, illustrating the position of the cover 20 of the lighting device in the elongated body between the open edges of the walls 11 and 12. Further, FIG. 6 shows a support 41, such as a circuit board, on which the one or more light sources are disposed such that the one or more light sources are located in the space delimited by the bottom 13 of the body, the walls 12, 13 and the cover 20.

Figure 5:
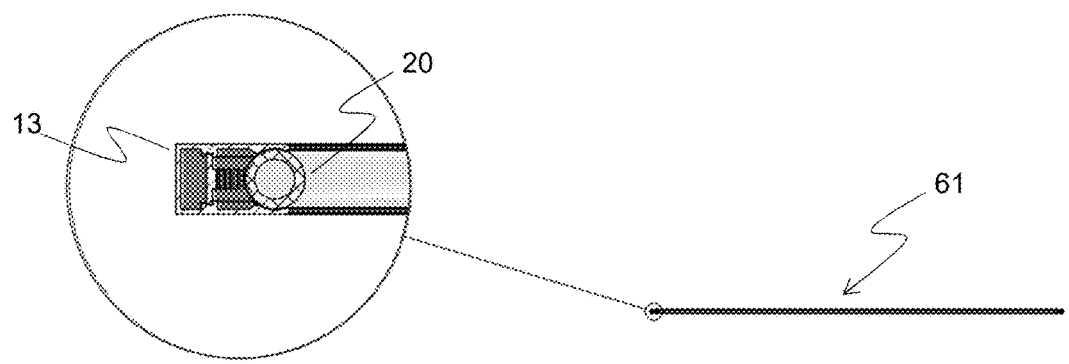
FIG. 5 is a cross-sectional view of a lighting device according to one embodiment of the invention.

The curved portion of the body of the lighting device may also be provided in the direction of the walls of the lighting device, whereby the bottom of the body is formed convex. In this case, the light output by the lighting device is mainly directed in the bending direction. If, for example, the body forms a circle or a segment of a circle, the light is mainly directed towards the centre of this circle. FIG. 5 shows an embodiment in which the lighting device forms a circle. Specifically, FIG. 5 shows a cross-section 61 of a circular lighting device and a detail of the cross-section, in which the cover 20 of the lighting device is disposed facing the centre of the circular lighting device, the bottom 13 of the body being in this case located on the outer circumference of the lighting device.

In the lighting device according to the invention, the cover is preferably formed from a PC tube, i.e. polycarbonate tube, having a suitable fire rating for use in a lighting device. The cover may also be other plastic material having similar properties in terms of the fire rating.

According to one embodiment of the invention, the cover of the lighting device is formed from a tube manufactured by co-extrusion from two different plastic materials. When the cover is manufactured by co-extrusion from two different plastic materials, differing optical properties may be provided in the tube. By co-extrusion, it is possible, for example, to form a tube in which the opposite surfaces have different opacities. When the cover of the lighting device is a tube in which the opacities on the opposite sides of the tube differ from each other, the illuminating points provided by separate light sources installed in the lighting device may be blended, and the lighting device will appear to output uniform light.

Figure 4:
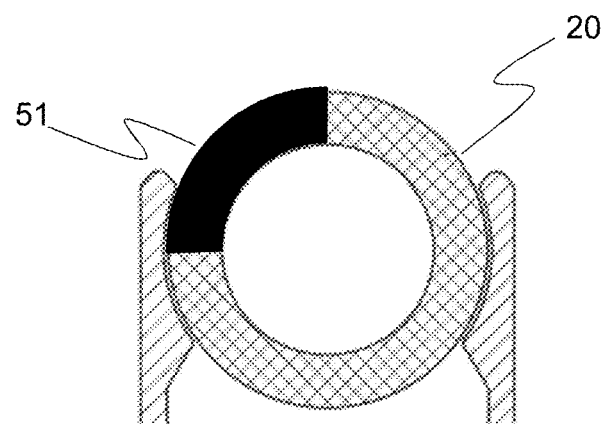
FIG. 4 shows a detail of a lighting device of one embodiment of the invention.

By co-extrusion, it is also possible to form a tube a portion of which is fully or almost fully light impervious. When the cover of the lighting device is formed from such tube, the angle of the radiation output by the lighting device may be controlled by means of positioning of the tube. In this case, the tube is positioned such that the light impervious portion is disposed so as to block the opening between the free edges of the walls. FIG. 4 shows a detail of a lighting device of one embodiment, illustrating the walls and the cover 20. The cover 20 has a light impervious portion 51 blocking the opening between the free edges of the walls. Thus, the light produced by lighting may be directed at a suitable angle from the lighting device.

It has been described above in connection with co-extrusion how different parts of the tube can be provided with different properties. It is obvious that these different parts refer to parts in the cross-section of the tube as shown in FIG. 4. For example, in connection with FIG. 4 the light impervious portion extends along the length of the tube.

Grooves or sockets are formed on the inner surfaces of the walls of the body to receive the tube used as the cover, such that the walls exert a pressing force on the tube. The grooves or sockets are formed in proximity to the open edges of the walls, the cover being preferably partly outside of a plane formed by the open edges of the walls. In other words, the cover is partly inside and partly outside of the U-shaped body; however, the widest point of the tube is between the inner surfaces of the walls.

The curved portion of the body may be provided in the plane formed by the bottom of the body, or inwardly, such that the bottom of the body is convex. When the cover is installed to the bent body, the tube used as the cover is pushed between the walls, and specifically in the depressions or grooves on the inner surfaces of the walls. The bending of the body is made such that when the PC tube is pushed in its place, the force exerted on the body by the bent PC tube is applied in the direction of the walls or the bottom of the body.

Even if the PC tube would not completely adapt to the shape of the body, but would exert forces tending to straighten the tube still after being installed, such forces are exerted towards the walls, as the curved portion of the body is provided in the plane defined by the bottom of the body. The structure of the invention enables a cover having a smooth cross-section to be connected to the aluminium profile. Herein, a smooth cover refers to a tube used as the cover with no protrusions for fastening the tube. The cross-section of the tube is preferably round. The advantage of a round tube is its symmetry, so there is no need to ensure that the tube is oriented correctly when the tube is being installed. The tube may also have an oval cross-section, or it may take an oval shape after being installed in the space between the grooves formed on the walls of the body.

According to one embodiment of the invention, the walls 11, 12 of the body extend substantially parallel from the bottom of the body. Thus, the flanges of the "U" of the body having the U-shaped profile are parallel. Further, according to one embodiment the open edges of the walls of the body have opposite grooves in the longitudinal direction of the body to receive the cover, i.e. the tube. The curve of the grooves is adjusted to be such that the tube can be pushed into the groove, but the tube does not move closer to the bottom of the body than the position defined by the grooves. This is achieved for example such that the wall is thicker on the side of the groove closer to the bottom than on the side closer to the open edge of the wall. In other words, the distance between the walls is smaller closer to the bottom of the body than on the other side of the grooves. Because the distance between the walls is smaller closer to the bottom of the body than to the open edges of the walls, the bent tube may also exert a force towards the bottom of the body as described above. In this case, the walls of the body receive the forces tending to straighten the tube.

The lighting device according to the invention comprises at least one light source, preferably an LED light source. The advantage of LED light sources is their small physical size and easy controllability. Because the lighting device is elongated, there are typically several LED light sources in the lighting device distributed along the full length of the lighting device. This way, the lighting device provides uniform lighting. The uniformity of the lighting output by the lighting device also depends on the properties of the tube used as the cover. The light source may be any type of light source suited for the space, such as an OLED, a laser or a luminous film.

According to one embodiment of the invention, the body of the lighting device comprises fasteners for fastening the light sources to the body. The fasteners are preferably part of the body. The cross-section of FIG. 1 shows fasteners 14, 15 on the inner surfaces of the walls. Because the fasteners are part of the profile, they extend along the full extent of the body of the lighting device. The fasteners shown in FIG. 1 are disposed on the inner surfaces of the walls between the bottom and the cover. The fasteners enable the light source to be fastened for example by way of a circuit board, by inserting the circuit board in grooves being formed. One or more light sources are provided on one circuit board. Typically, several circuit boards are disposed in the lighting device at suitable longitudinal locations. The light sources of the lighting device of the invention are preferably disposed at a distance from the bottom of the body. The light sources are in this case not disposed in contact to the bottom, but are fastened to the inner surfaces of the walls by means of a support, such as a circuit board.

When the light sources with their supports are located at a distance from the bottom of the body, there will be left some space between the bottom and the support for wirings supplying current to the light sources. Thus, the wirings are not able to obstruct the light from being emitted from the light sources to the cover.

Figure 3:
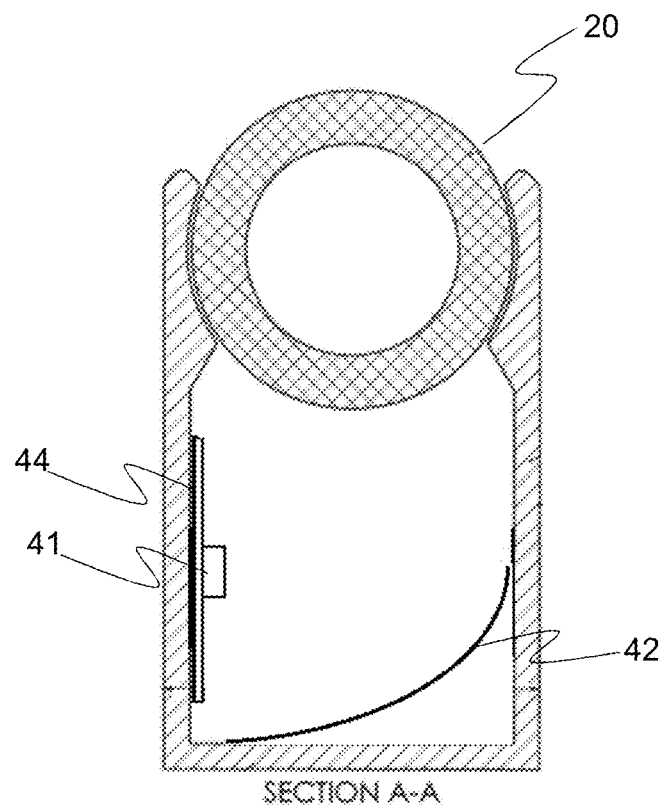
FIG. 3 is a cross-sectional view of a lighting device of another embodiment of the invention.

The light sources may be optionally located between the body and the cover, and the light sources may also be located on the bottom of the body. FIG. 3 is a cross-sectional view of a lighting device according to one embodiment, in which one or more light sources 41 are located in connection with the wall of the body, and the bottom and the opposite wall of the body are provided with a reflecting surface 42 for reflecting the light output by the light sources towards the cover 20 of the lighting device. As seen in FIG. 3, the reflecting surface 42 at least partly overlies the bottom of the body and the wall opposite to the light source. The light source 41 is shown as mounted on a support, such as a circuit board 44.

In one embodiment of the invention, the bottom of the body comprises two or more fastening holes for fastening the body to a fastening point. The body may in this case be fastened by screwing it to the fastening point through the holes. The body and the lighting device may also be fastened by other means to a suitable location. The curved lighting device according to the invention may be used, for example, to provide interior or decorative lighting. One application is to arrange it to the edge of or above a curved counter or other such curved structure to provide decorative light. The diameter of the tube used as the cover of the lighting device may be, for example, in the range of 10 mm-40 mm.

According to the method of the invention, a body of a lighting device is produced, the body comprising at least one curved portion and a bottom, and walls extending from the bottom and having open edges. According to FIG. 1, the curved portion of the body is provided in the direction of the walls of the body, such that the outer face of one of the walls curves inwardly, while the outer face of the other wall curves outwardly. The curved portion may also be, as described above in connection with the lighting device, formed towards the open area of the body, the bottom of the body thus being formed convex at the curved portion.

According to the method of the invention, one or more light sources are disposed between the walls of the body. The light sources are preferably fastened to the opposite inner surfaces of the walls. Fasteners or the like are preferably formed on the inner surfaces to facilitate the fastening. Such fasteners may be, for example, protrusions or pairs of protrusions extending from the inner surfaces towards each other. The one or more light sources may first be mounted on a support, such as a circuit board, that is supported to the protrusions of the inner surfaces.

Further according to the method of the invention, a light transmitting plastic material tube is disposed between the walls of the body, whereby the one or more light sources are located between the tube and the bottom of the body. The plastic material tube is preferably a PC tube that may be located between the walls of the body to form the cover of the lighting device. The PC tube may be bent and pushed onto the body. In proximity to the free edges of the walls of the body there are grooves or the like, formed on the inner surfaces of the walls to extend in the longitudinal direction of the body. The plastic material tube is preferably disposed between the walls, in the grooves or the like of the walls, to fasten the tube.

The invention has been described with reference to an aluminium profile forming the body of the lighting device. An aluminium profile refers herein to an elongated object extruded from aluminium, having the same cross-section along its full length. An example of this cross-section is shown in FIG. 1.

It is obvious for a person skilled in the art that with the advancement of technology, the basic idea of the invention may be implemented in various ways. The invention and its embodiments are thus not limited to the examples described above, but may vary within the scope of the claims.

The invention claimed is:

1. A lighting device, comprising an elongated body, a cover, and one or more light sources, wherein
the body of the lighting device comprises a bottom and walls extending from the bottom and having open edges, and
the cover of the lighting device is formed from a light transmitting plastic material tube,
wherein the light transmitting plastic material tube has a cross-section that is smooth and round or oval, and the cross-section of the light transmitting plastic material tube is arranged between the open edges of said walls at a distance from the bottom, the one or more light sources being located in a space delimited by the body and the cover of the lighting device, and the body of the lighting device comprises at least one curved portion to provide a curved lighting device, and wherein differing optical properties are formed in the light transmitting plastic material tube in different parts of the cross-section of the light transmitting plastic material tube.

2. The lighting device according to claim 1, wherein the body is formed from an aluminium profile, and the curved portion of the body of the lighting device is formed by bending the body.

3. The lighting device according to claim 1, wherein the body is an injection moulded plastic body comprising at least one curved portion.

4. The lighting device according claim 1, wherein the walls of the body extend parallel from the bottom of the body.

5. The lighting device according to claim 1, wherein in proximity to the open edges of the walls of the body, on the inner surfaces of the walls, there are recesses to receive the light transmitting plastic material tube.

6. The lighting device according to claim 1, comprising fasteners for fastening the light source in the space delimited by the light transmitting plastic material tube and the body.

7. The lighting device according to claim 6, wherein the fasteners are part of the body, and are disposed on the inner surfaces of the walls at a distance from the bottom of the body.

8. The lighting device according to claim 6, wherein the fasteners are arranged to receive the light source arranged on a support.

9. The lighting device according to claim 5, wherein the recesses on the inner surfaces of the walls for receiving the light transmitting plastic material tube are disposed such that after being installed, part of the light transmitting plastic material tube is disposed outside of a plane formed by the open edges.

10. The lighting device according to claim 1, wherein the light transmitting plastic material tube is a polycarbonate tube.

11. The lighting device according to claim 1, wherein the light transmitting plastic material tube is formed by co-extrusion.

12. A method for forming an elongated lighting device, wherein the method comprises the steps of:
producing a body of the lighting device, comprising at least one curved portion and a bottom, and walls extending from the bottom and having open edges;
disposing one or more light sources between the walls of the body; and
disposing a light transmitting plastic material tube, having a smooth and round or oval cross-section, between the walls of the body, wherein the one or more light sources are located between the light transmitting plastic material tube and the bottom of the body, and wherein differing optical properties are formed in the light transmitting plastic material tube in different parts of the cross-section of the light transmitting plastic material tube.

13. The method according to claim 12, wherein the step of producing the body of the lighting device comprises steps of producing the body of the lighting device from an aluminium profile, and forming the curved portion to the body by bending the body.

14. The method according to claim 12, wherein the step of producing the body of the lighting device comprises a step of producing the body by injection moulding from a plastic material.

* * * * *